(12) United States Patent
Demonica et al.

(10) Patent No.: US 7,658,642 B2
(45) Date of Patent: Feb. 9, 2010

(54) MOLDED PLASTIC PASS THROUGH ARTICLE WITH FLEXIBLE TRANSVERSE LOCK ARMS

(75) Inventors: Michael J. Demonica, Cortland, OH (US); William G. Strang, Warren, OH (US)

(73) Assignee: Delphi Technologies, Inc., Troy, MI (US)

( * ) Notice: Subject to any disclaimer, the term of this patent is extended or adjusted under 35 U.S.C. 154(b) by 327 days.

(21) Appl. No.: 11/899,878

(22) Filed: Sep. 7, 2007

(65) Prior Publication Data

US 2009/0065656 A1 Mar. 12, 2009

(51) Int. Cl.
*H01R 13/73* (2006.01)
(52) U.S. Cl. ..................................................... 439/557
(58) Field of Classification Search .................. 439/557, 439/558, 556, 552, 542
See application file for complete search history.

(56) References Cited

U.S. PATENT DOCUMENTS

| 3,753,212 | A | * | 8/1973 | Yamada et al. .............. 439/358 |
| 4,840,585 | A | * | 6/1989 | Muzslay ...................... 439/556 |
| 5,252,088 | A | | 10/1993 | Morello et al. |
| 5,348,498 | A | | 9/1994 | Morello et al. |
| 5,800,208 | A | * | 9/1998 | Ishizuka et al. ............. 439/557 |
| 6,508,666 | B1 | | 1/2003 | Francis |
| 6,641,420 | B2 | * | 11/2003 | Blanchfield et al. .......... 439/247 |
| 6,896,524 | B1 | * | 5/2005 | Morello et al. ................ 439/66 |
| 7,371,110 | B2 | * | 5/2008 | Murakami et al. ........... 439/557 |
| 2004/0077213 | A1 | * | 4/2004 | Sakiyama et al. ........... 439/557 |

* cited by examiner

*Primary Examiner*—Neil Abrasm
*Assistant Examiner*—Phuong Nguyen
(74) *Attorney, Agent, or Firm*—Thomas N. Twomey

(57) ABSTRACT

An electrical connector has a connector body in the form of a molded plastic pass through article that has a cylindrical portion that is inserted into a panel hole. The article has a flange at one end of the cylindrical portion engaging an insertion side of the panel, and a plurality of supports extending from an opposite end of the cylindrical portion in an axial direction away from the cylindrical portion. A plurality of flexible transverse lock arms are attached to the plurality of supports and extend therefrom in cantilever fashion. The plurality of flexible transverse lock arms are spaced from the cylindrical portion in the axial direction and terminate in lock feet that engage the back side of the panel.

10 Claims, 1 Drawing Sheet

MOLDED PLASTIC PASS THROUGH ARTICLE WITH FLEXIBLE TRANSVERSE LOCK ARMS

BACKGROUND OF THE INVENTION

This invention relates generally to a molded plastic pass through article that passes through a hole in a panel and retained in a supported relationship with the panel by engaging portions on opposite sides of the panel adjacent the hole.

A molded plastic pass through article is typically inserted into the hole from one side of the panel and retained in the supported relationship with the panel by rigid portions and flexible longitudinal fingers of the pass through article. The rigid portions engage the insert side of the panel and the flexible longitudinal fingers deflect to pass through the hole and then recover to provide locks that engage the back side of the panel.

The flexible fingers are typically long cantilevered fingers that protrude through the panel hole in a longitudinal or axial direction from the insert side of the panel and lock against the back side of the panel at the opposite end or tip of the long cantilevered finger. These long flexible fingers typically require a relatively thick panel with a long hole, a long pass through article and more space behind the panel.

Moreover, a pass through article is typically sealed by an elastomeric O-ring that sits in a circumferential groove of the article. Thus in addition to axial length required for the flexible longitudinal fingers to deflect without breakage, additional axial length is required to accommodate the O-ring groove and lands on either side of the O-ring groove. See for instance, U.S. Pat. No. 5,252,088 granted to John R. Morello et al Oct. 12, 1993 for a sealed pass through electrical connector having a connector body that is a molded plastic pass through article.

Furthermore, an even thicker panel with a longer hole and longer pass through article may be required if the pass through article is made of a filled plastic material with a lower strain limit that may be used for stability reasons to meet sealing requirements.

SUMMARY OF THE INVENTION

The pass through article of the invention reduces the axial length of the panel hole that is required to lock the pass through article in a supported relationship with the panel as well as the axial length of the pass through article itself in comparison to known designs of the type discussed above.

The pass through article of the invention has flexible transverse lock arms that flex in a transverse direction rather than in a longitudinal direction thus improving retention in the longitudinal direction as well as reducing the length of the pass through article. Moreover, the transverse orientation of the flexible lock arm not only reduces the length of the pass through article but also reduces package size and material usage for the article and for electric terminals if the pass through article is a connector body for an electrical connector. Since the lock arms flex in a transverse direction during installation and the direction of flex during retention is longitudinal, retention can be increased without any significant increase in the installation force requirement resulting in an improved to retention to engage force ratio. Moreover, filled plastic materials can be used because the flexible transverse lock arm can be lengthened without increasing the length of the pass through article. Furthermore, the pass through article eliminates breakage and low retention problems of some prior art designs.

DETAILED DESCRIPTION OF THE PREFERRED EMBODIMENTS

Figure 1:
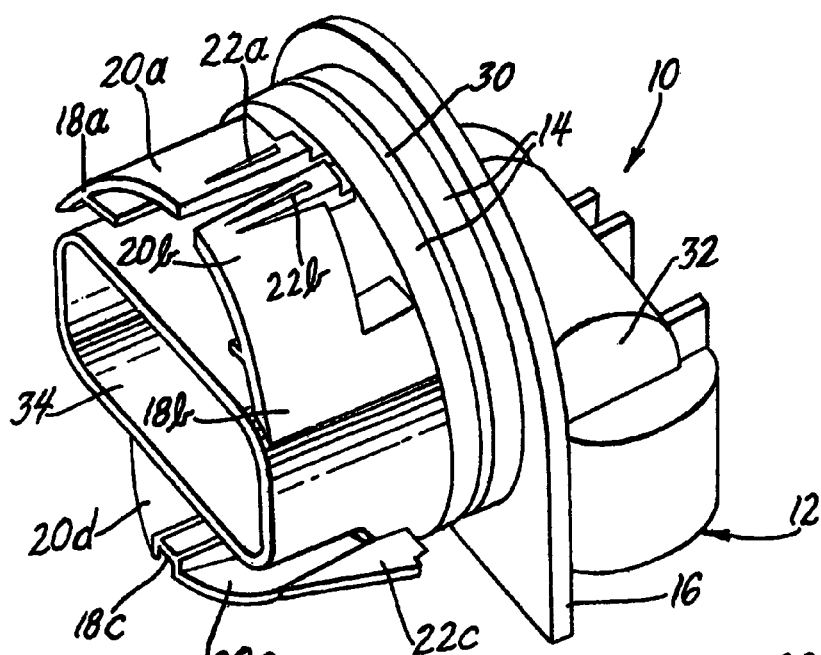
FIG. 1 is a perspective view of a pass through article illustrating an embodiment of the invention.
Figure 2:
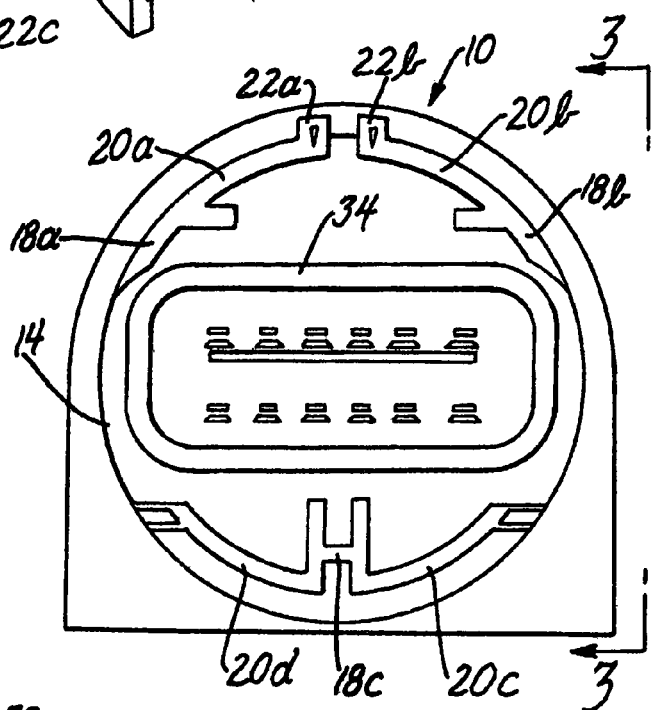
FIG. 2 is an insertion end view of the pass through article shown in FIG. 1.
Figure 3:
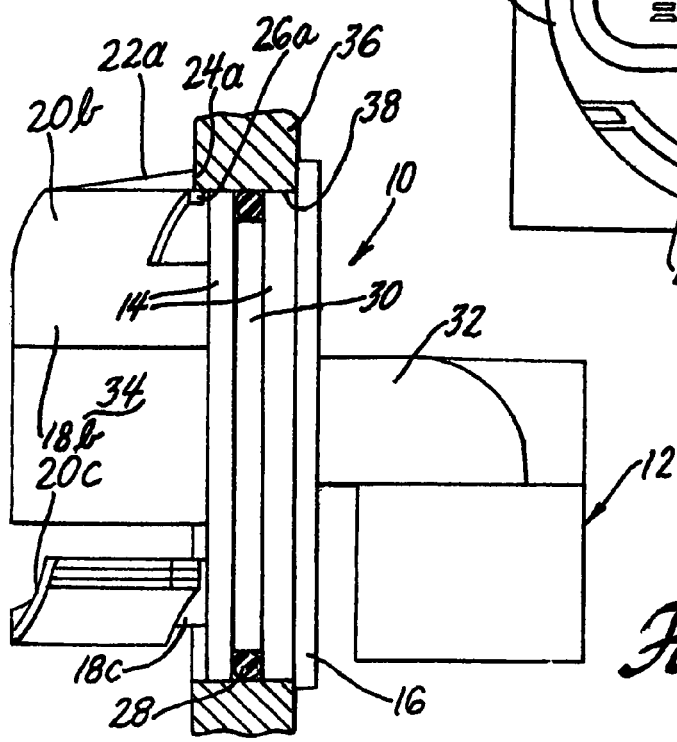
FIG. 3 is a partially sectioned side view of the pass through article shown in FIG. 1 installed in a support panel.

Referring now to FIGS. 1, 2 and 3, an embodiment of the invention is illustrated in connection with an electrical connector 10 in which the connector body is in the form of a molded plastic pass through article 12. Article 12 has a cylindrical portion 14 for insertion into a panel hole, a substantially rigid flange 16 at one end of the cylindrical portion 14 and a plurality of circumferentially spaced supports 18a, 18b and 18c that extend from an opposite end of the cylindrical portion 14 in an axial or longitudinal direction away from the cylindrical portion 14. Article 12 also has a plurality of flexible transverse lock arms 20a, 20b, 20c and 20d that are attached to the plurality of supports 18a, 18b and 18c and that extend from the supports 18a, 18b and 18c in cantilever fashion. Lock arms 20a, 20b, 20c and 20d are preferably curved and have the same outer diameter as cylindrical portion 14. These flexible lock arms 20a, 20b, 20c and 20d are spaced from the cylindrical portion 14 in the axial direction and have ramps 22a, 22b, 22c and 22d at their respective free ends that slope outwardly in the axial direction toward the cylindrical portion 14. Ramps 22a, 22b, 22c and 22d terminate in respective lock feet 24a, 24b, 24c and 24d that face the flange 12 and pads 26a, 26b, 26c and 26d that are inward of the lock feet in a radial direction. Pads 26a-26d project toward and are spaced from the opposite end of the cylindrical portion 14 so that the transverse flexible lock arms 20a-20d deflect inwardly freely with the feet 24a-24d and pads 26a-26d moving inwardly in a generally radial direction.

The four flexible transverse lock arms 20a, 20b, 20c and 20d comprise a first pair of lock arms 20a and 20b and a second pair of lock arms 20c and 20d. The first pair of flexible transverse lock arms 20a and 20b extend from respective supports 18a and 18b in a circumferential direction toward each other while the second pair of flexible transverse lock arms 20c and 20d extend form a common support 18 in a circumferential direction away from each other. This arrangement results in a generally triangular arrangement of lock feet at three generally equally spaced apexes, with the lock feet 24a and 24b located near each other at one apex and the lock feet 24c and 24d located at two other respective apexes spaced about 120 degrees from each other and the lock feet 24a and 24b in opposite circumferential directions.

The pass through article 12 may carry an elastomeric O-ring seal 28 in a circumferential groove 30 which is a common feature in many pass through articles. As indicated above, the pass through article 12 may be the connector body of an electrical connector 10 that carries electrical terminals (not shown) in the cylindrical portion 14 and thus the pass through article 12 may also include an article portion 32 that extends from the flanged end of the cylindrical portion 14 and/or an article portion 34 that extends the opposite or insertion end of the cylindrical portion 14 that serve as connector body portions for an electrical connector. Thus the article portions 32 and 34 may be part of electrical sockets as shown or electrical plugs (not shown). Article portion 32 may be a right angled portion as shown or an axial portion like article portion 34. However, article portion 34 must be axial and spaced inwardly of the flexible transverse lock arms 20a-20d.

FIG. 3 is a partially sectioned side view of the electrical connector 10 installed on a panel 36 having a hole 38. The pass through article 12 which serves as the connector body of the electrical connector 10 is inserted into the hole 38 lock end first with lock arm 20a-20d guiding the pass through article 12 through the hole until the flange 16 engages the insertion side of the panel 36 adjacent the hole 38. As the pass through article 12 is guided through the hole 38, ramps 22a-22d engage an edge of the hole 38 on the insertion side of the panel 36 and cam the ends of the lock arms 20a-20d inwardly in a generally radial direction while deflecting the flexible transverse lock arms 20a-20d transversely in a generally spiral like manner. Pass through article 12 is inserted into hole 38 until the lock feet 24a-24d pass through the hole 38 and the flange 16 engages the insertion side of the panel 36 whereupon the flexible lock arms 20a-20d rebound so that the lock feet 24a-24d engage the back side of the panel 36 adjacent the hole 38 and the pads 26a-26d engage or are biased against the surface of the hole 38 to hold the lock feet 24a-24d in place as shown in FIG. 3.

The pads 26a-26d can be spaced very close to the end of the cylindrical portion 18 of the pass through article 12 so long as the transverse lock arms 20a-20d are free to flex inwardly during insertion of the front end of the pass through article 12 through the hole 38. Thus the length of the hole 38 need only be a little longer than the length of the cylindrical portion 14 of the pass through article 12, that is, the length of the cylindrical portion 18 plus the length of the pads 26a-26d and the length of space between the end of the pads 26a-26d and the cylindrical portion 18 of the pass through article 12 which space need only be long enough for tooling clearance. The length of pads 26a-26d and the tooling space is considerably shorter than the length of the flexible longitudinal fingers that are used in the prior art described above and thus the flexible transverse lock arms 20a-20d of the pass through article 10 save considerable longitudinal space by reducing the length requirement for the panel hole 38 even when the pass through article 10 includes an optional O-ring seal such as the O-ring seal 28.

It should be noted that the entire locking mechanism for engaging the back side of panel 36 comprising supports 18a-18d and lock arms 20a-20d is located on the front or insertion end of the pass through article 12 that is forward of the cylindrical portion 14 by utilizing the available space above as well as below article portion 34 at the insertion end of the pass through article 12 which may be used for receiving a mating electrical plug (not shown). In this regard the overall length, is further reduced by allowing the article portion 34 to be as close as possible to the hole 38.

The flexible transverse lock arms 20a-20d preferably have a curved surface protruding along the circumference of the cylindrical portion 18 to facilitate installation. Moreover, the locking feet 24a-24d with ramps 22a-22d and pads 26a-26d located at the end of the lock arms 20a-20d provide an audible click and tactile feel to facilitate installation, particularly a blind installation. Moreover, the pads 26a-26d provide overstress protection for the lock arms 20a-20d in the installed position. The lock arms 20a-20d flex radially inward easily during installation due to the lock arm geometry and loading. However, the retention forces are applied axially to the ends of the lock arms 20a-20d trying to induce bending about the lock arms strongest crossection at the supports 18a-18c. This arrangement provides high retention forces with low installation forces. Thus the pass through article 12 saves axial space, reduces package size, requires less material, provides an increased retention force with a reduced installation force, provides overstress features, reduces sensitivity to breakage due to overdeflection and handling, and reduces the chance for sealing issues due to sink at an O-ring groove.

While four flexible transverse lock arms 20a-20d are illustrated, a lesser or greater number can be used. In other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A molded plastic pass through article comprising:
   the article having a cylindrical portion for insertion into a panel hole,
   the article having a flange at one end of the cylindrical portion and a plurality of supports extending from an opposite end of the cylindrical portion in an axial direction away from the cylindrical portion, and
   the article having a plurality of flexible transverse lock arms attached to the plurality of supports and extending therefrom in cantilever fashion, the plurality of flexible transverse lock arms being spaced from the cylindrical portion in the axial direction and terminating in lock feet facing the flange.

2. The molded plastic pass through article as defined in claim 1 wherein the flexible transverse lock arms have pads inward of the lock feet in a radial direction, the pads projecting toward and being spaced from the opposite end of the cylindrical portion.

3. The molded plastic pass through article as defined in claim 1 wherein the plurality of flexible transverse lock arms comprise a first pair of flexible transverse lock arms that extend in a circumferential direction toward each other and a second pair of flexible transverse lock arms that extend in a circumferential direction away from each other.

4. The molded plastic pass through article as defined in claim 3 wherein the lock feet of the first pair of flexible transverse lock arms are near each other and the lock feet of the second pair of flexible transverse lock arms are spaced from the lock feet of the first pair approximately 120 degrees in opposite directions.

5. A molded plastic pass through article comprising:
   the article having a cylindrical portion for insertion into a panel hole,
   the article having a relatively rigid flange at one end of the cylindrical portion and a plurality of supports extending from an opposite end of the cylindrical portion in an axial direction away from the cylindrical portion,
   the article having a plurality of flexible transverse curved lock arms attached to the plurality of supports and extending therefrom in a circumferential direction, the plurality of flexible transverse curved lock arms being spaced from the cylindrical portion in the axial direction, the plurality of flexible transverse curved lock arms having ramps at their respective free ends that slope outwardly in the axial direction toward the cylindrical portion, the ramps terminating in lock feet facing the flange and pads inward of the lock feet in a radial direction, the pads projecting toward and being spaced from the opposite end of the cylindrical portion.

6. The molded plastic pass through article as defined in claim 5 wherein the cylindrical portion has a diameter and the flexible, transverse curved lock arms have an outer curved surface that has the same diameter as the cylindrical portion.

7. The molded plastic pass through article as defined in claim 5 wherein the plurality of flexible transverse curved lock arms comprise a first pair of flexible transverse curved lock arms that extend in a circumferential direction toward each other and a second pair of flexible transverse curved lock arms that extend in a circumferential direction away from each other.

8. The molded plastic pass through article as defined in claim 7 wherein the lock feet of the first pair of flexible transverse curved lock arms are near each other and the lock feet of the second pair of flexible transverse curved lock arms are spaced from the lock feet of the first pair approximately 120 degrees in opposite directions.

9. The molded plastic pass through article as defined in claim 8 wherein the cylindrical portion has a circumferential groove and the pass through article includes an elastomeric O-ring seal disposed in the circumferential groove.

10. The molded plastic pass through article as defined in claim 9 further including an article portion that extends from the cylindrical portion in a direction away from the flange, the article portion being spaced radially inwardly of the flexible, transverse curved lock arms.

\* \* \* \* \*